United States Patent [19]

Kane

[11] Patent Number: 4,856,346

[45] Date of Patent: Aug. 15, 1989

[54] DUAL FLEXURES FOR CORIOLIS TYPE MASS FLOW METERS

[75] Inventor: Martin Kane, Atlantic City, N.J.

[73] Assignee: K-Flow Division of Kane Steel Company, Inc., Millville, N.J.

[21] Appl. No.: 929,872

[22] Filed: Nov. 13, 1986

[51] Int. Cl.$^4$ .............................................. G01F 1/84
[52] U.S. Cl. .................................................. 73/861.38
[58] Field of Search .................... 73/861.38, 861.37

[56] References Cited

U.S. PATENT DOCUMENTS

| | | |
|---|---|---|
| 2,624,198 | 1/1953 | Pearson . |
| 2,811,854 | 11/1957 | Powers . |
| 2,813,423 | 11/1957 | Altfillisch et al. . |
| 2,831,349 | 4/1958 | Altfillisch et al. . |
| 2,834,209 | 5/1958 | Jones et al. . |
| 2,865,201 | 12/1958 | Roth . |
| 3,080,750 | 3/1963 | Wiley et al. . |
| 3,108,475 | 10/1963 | Henderson . |
| 3,218,851 | 11/1965 | Sipin . |
| 3,251,226 | 5/1966 | Cushing ............................ 73/861.18 |
| 3,329,019 | 7/1967 | Sipin . |
| 3,355,944 | 12/1967 | Sipin . |
| 3,396,579 | 8/1968 | Sourian . |
| 3,444,723 | 5/1969 | Wakefield . |
| 3,456,491 | 7/1969 | Brockhaus . |
| 3,927,565 | 12/1975 | Paulin ............................... 73/194 M |
| 3,955,401 | 5/1976 | Catherall ............................ 73/32A |
| 4,109,524 | 8/1978 | Smith ............................... 73/861.37 |
| 4,127,028 | 11/1978 | Cox et al. .......................... 73/861.38 |
| 4,187,721 | 2/1980 | Smith ................................. 73/194B |
| 4,252,028 | 2/1981 | Smith ............................... 73/861.38 |
| 4,444,059 | 4/1984 | Smith ............................... 73/861.38 |
| 4,491,025 | 1/1985 | Smith et al. ....................... 73/861.38 |
| 4,559,833 | 12/1985 | Sipin ................................. 73/861.38 |
| 4,622,858 | 11/1985 | Mizerak ............................ 73/861.38 |
| 4,628,744 | 12/1986 | Lew ................................... 73/861.38 |
| 4,653,332 | 3/1987 | Simonsen .......................... 73/861.38 |
| 4,655,089 | 4/1987 | Kappolt et al. ................... 73/861.38 |
| 4,658,657 | 4/1987 | Kuppers ............................ 73/861.38 |
| 4,660,421 | 4/1987 | Dahlin et al. ..................... 73/861.38 |
| 4,680,974 | 7/1987 | Simonsen et al. ................ 73/861.38 |
| 4,691,578 | 9/1987 | Heezl ................................ 73/861.38 |
| 4,703,660 | 11/1987 | Brenneman ...................... 73/861.38 |
| 4,716,771 | 1/1988 | Kane ................................. 73/861.38 |
| 4,730,501 | 3/1988 | Levien .............................. 73/861.38 |
| 4,733,569 | 3/1988 | Kelsey et al. .................... 73/861.28 |

*Primary Examiner*—Herbert Goldstein
*Attorney, Agent, or Firm*—Seidel, Gonda, Lavorgna, Monaco

[57] ABSTRACT

A Coriolis type mass flow meter including a conduit having flexure portions which extend in the same direction and, preferably, are formed in a single plane. The flexure portions are positioned on opposite sides of the conduit driver and deflect the fluid flow away from the line defined by the input and output of the conduit so as to create an isolated deflection arm for the Coriolis reaction force. The conduit increasing the signal to noise ratio of the meter while decreasing the restrictions on the fluid flow passing through the conduit.

15 Claims, 1 Drawing Sheet

DUAL FLEXURES FOR CORIOLIS TYPE MASS FLOW METERS

BRIEF SUMMARY OF THE INVENTION

The present invention relates to mass flow meters of the type which impart a transverse oscillation to the flow within a conduit to create a Coriolis reaction by the fluid. The effect of the Coriolis reaction against the conduit is then measured and correlated to the mass flow through the conduit. The present invention particularly relates to a continuous conduit having flexure portions which effectively increase the sensitivity of the flow meter while also limiting flow restriction through the conduit.

BACKGROUND OF THE INVENTION

Meters which determine the mass flow by measuring the Coriolis reaction force of a fluid within a conduit as developed in the 1950's included conduits which are rotated about a fixed axis. The rotation of the conduit creates a constant fluid reaction force couple against the conduit tubing. A rotational type meter is shown in Pearson, Pat. No. 2,624,198.

More recently developed Coriolis type flow meter structures utilize an oscillating or vibrating conduit drive system for creation of an alternating Coriolis reaction force by the fluid. A vibrational type meter structure is described in the Roth Pat. No. 2,865,201 and includes a generally circular conduit structure which is intended to simulate the rotational or gyroscopic type movement of the rotating conduit type meters.

Pat. Nos. 3,218,851; 3,261,205; and 3,329,019 to Sipin teach substantially straight conduits, oscillated perpendicular to the flow so as to produce the desired Coriolis reaction. There is minimal restriction of the flow within the relatively straight conduit tubing, with restriction being created only by the internal operating structure of the meter. However, these Sipin (and Roth, as referred to above) type meter structures are greatly limited in their ability to sense the Coriolis reaction.

A structural variation in vibrational or oscillatory type conduits, which is intended to increase the sensitivity of the meter, is described in Sipin's Pat. Nos. 3,355,944 and 3,485,098. The conduit structure in these patents introduces a deflection or displacement of the flow away from the typically straight line formed by the defined fluid stream or pipeline in which the flow meter is placed, and creates a substantially U-shaped conduit. The conduit tubing is vibrated at the point of maximum displacement which is located at the center of the U-shape. The maximum curvature of the U-shaped tubing in these patents is limited to 180°. The Coriolis reaction force is measured on opposite sides of the imparted vibration on the leg portions of the U-shape.

Cox et al., Pat. No. 4,127,028, shows a cantilevered U-shaped conduit structure having rigidly mounted fixed input and output ends and including inwardly and outwardly extending bends on the leg portions of the U-shape. The U-shape is vibrated at its bight or projected end so as to create a cantilevered spring-like structure from its fixed mounting position. Additionally, a second similarly shaped conduit may be positioned adjacent the first conduit creating a tuning fork effect when vibrated. The inwardly and outwardly extending bends on the leg portions of the conduit are included to increase the moment arm of the Coriolis reaction force on the U-shape about a deflection axis, which is defined within the patent text as being positioned at the symmetrical center line of the U-shape. The flow through each U-shaped portion of the conduit is parallel with a fluid particle making two complete loops between the input and output of the conduit. The joinder of the two loops or U-shaped portions is fixedly mounted adjacent the input and output of the conduit. The dual U-shaped conduit design of these patents creates substantial flow restriction by including numerous turns and reversals in the direction of flow as well as by requiring a perpendicular deflection of the flow direction at the input and output of the flow meter conduit from the pipeline or defined fluid stream.

FIG. 5 of the Cox '028 patent shows a projecting, substantially circular or spiraled loop having fixed input and output ends which are substantially coaxial with the pipeline feeding the flow into the conduit. This type mounting structure increases the flexibility of the tubing by increasing the tortional bending of the flow tube due to the combined effect of the applied oscillation and the Coriolis reaction. This type structure also limits flow restriction at the input and output ends of the conduit as well as utilizing gently curved tubing portions in directing the fluid flow through the conduit shape.

Pat. No. 4,491,025 to Smith utilizes a flow splitting manifold to eliminate the continuous double loop formation in the Cox '028 dual U-shaped tube design. The flow splitting manifold supplies substantially equivalent flow in the same direction to both U-shaped conduits. However, the flow into the conduit is directed in a 90° turn from the direction of flow of a linear feed pipeline, thus, creating a flow restriction at the input and output ends.

Sipin Pat. No. 4,599,833 shows an S-shaped conduit having tight turns or curvature in its tubing formation so as to limit the lateral displacement of the conduit structure with respect to the axial line of the defined fluid stream. The conduit shape in this patent is also intended to increase the moment arms of the Coriolis reaction force with respect to the oscillatory motion, similar to the inward and outward bends in Cox '028, while limiting the size of the conduit structure. This structure, however, causes substantial flow restriction around the tight turns of the S-shaped tubing and also causes drastic reversal in the direction of flow within the conduit. A meter produced by the Smith Meter Company (the assignee of the Sipin '833 patent) utilizes an S-shaped conduit in which the turns in the direction of flow are gentler as compared to that shown ad by the Sipin '833 patent. This type structure eliminates the minimumal lateral displacement of the conduit as required by the patent. The S-shape portion of the Smith meter conduit is positioned substantially transverse to the line of the defined fluid stream; therefore, creating an initial restriction at the input and a corresponding restriction at the exhaust of the S-shape portion of the conduit.

A mass flow meter produced by the Danfoss Company of England includes two substantially parallel flow tubes which are positioned between opposite flow splitting manifolds. Each of the flow tubes is displaced slightly from the center line of the conduit (and the line formed by the defined fluid stream). Both flow tubes lie in a single plane so that the structure does not substantially form a projected dual U-tube configuration. The oscillatory driver is positioned at the center of the length with the Coriolis reaction being measured by sensing the twist in the opposing tubes with respect to one another.

SUMMARY OF THE INVENTION

The present invention relates to a Coriolis mass flow meter generally comprising a flow tube having two flexure portions and a central connecting section positioned between the inlet and outlet of the flow tube. The flow meter structure may include two substantially parallel flow tubes each having a similar form. The dual flow tubes are preferably fed by an inlet manifold which divides the flow and exhaust into a flow converging manifold at the outlet end. The portion of each flow tube adjacent to its inlet and outlet generally defines flexure portions which first displace the flow away from the line defined fluid stream and then return the flow towards that line or position. The central sections of each flow tube are adjacently positioned and are vibrated in an opposite mode by an oscillatory driver. The flexure portions and the central sections of each flow tube are, preferably, coplanar with a minimum of displacement from the center line of the flow tube or along a line substantially parallel to the oscillation direction. The Coriolis reaction of the flow due to the oscillating motion of the driver on the central section creates an opposite reaction on the opposing flexure portions on the respective input and the output sides of this oscillation.

By providing flexure portions and a generally independent central connecting section within the flow tube, a relatively long and substantially flexible conduit tubing is created. The flexure portions act as individual torsional bending arms and increase the area of conduit tubing on which the Coriolis reaction force gradient may act so as to effectively increase the measurable deflection of the tubing due to the Coriolis reaction. Therefore, the contemplated invention effectively increases the sensitivity of the meter. By varying the length of the displacement of the flexures from the axis line of the flow tube, the overall sensitivity of the flow meter to the Coriolis reaction may also be varied. Additionally, the individual conduit flexures may be provided with gentle curves so as to limit restriction on the fluid passing through the conduit.

Further advantages of the invention will become apparent to those skilled in the art by particularly describing a preferred embodiment. For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
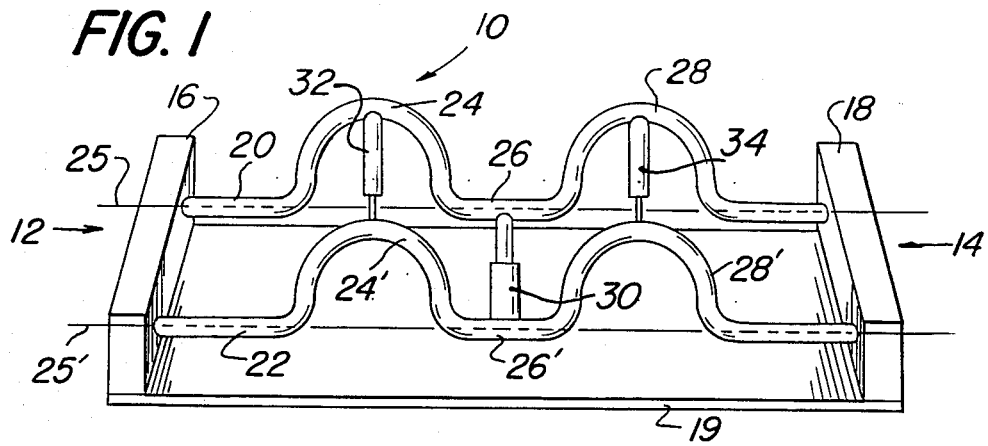
FIG. 1 shows an embodiment of a flow meter conduit as contemplated by this invention.

In the figures, where like numerals indicate like elements, there is shown a flow meter of conduit structure which is presently preferred. FIG. 1 shows one embodiment of the conduit 10 having an input end 12 and an output end 14 which communicate with a pipeline or a defined fluid stream (not shown). The input end 12 is preferably defined by a flow splitting manifold 16 which receives an input of fluid from a pipeline or defined fluid stream and divides the flow into two substantially equivalent and parallel flow paths. The output end 14 of the conduit 10 forms a flow converging manifold 18, similar to manifold 16, which receives the flow from both paths and redefines it into a singular flow for output into the pipeline. The splitting manifold 16 and converging manifold 18, as contemplated by this embodiment, may be of any construction as desired. Alternately, manifold 16 may define both the inlet and outlet to the defined fluid stream. Manifold 18 in this embodiment turns the flow so that it travels along the two flow paths in opposite directions. In either flow pattern discussed above, manifolds 16 and 18 are preferably fixedly mounted to a base 19.

The two flow paths formed between manifold 16 and manifold 18 are preferably defined by two substantially parallel and adjacently positioned flow tubes 20 and 22. A single flow tube 20 will be described herein to exemplify both of these structures with the corresponding structure in flow tube 22 being identified by the same numeral with a prime postscript.

The flow is introduced into tube 20 from manifold 16 and is initially directed into a first flexure portion 24. Flexure 24 may be of any shape which first displaces the flow away from the axial line 25 and then returns the flow toward this line 25 so as to create a torsional deflection arm. The first flexure 24 outputs into a central or connecting section 26 which, as shown in FIG. 1, is adjacent and coaxial with line 25. The central section 26 outputs into a second flexure portion 28 which first displaces the flow away from line 25 and then returns it toward line 25. The second flexure 28 may be of any form but is, preferably, symmetrical about the central section 26 with first flexure 24. The second flexure 28 communicates with manifold 18 at the output end 14.

Flexures 24, 28 as shown in FIG. 1 preferably lie within a single plane and are substantially coplanar with respect to one another. The flexures 24, 28 may vary in curvature as desired depending on the fluid and flow characteristics required. However, it is preferred that both flexures 24, 28 lie in a single plane which is substantially vertical and parallel with the plane of flow tube 22.

The first flow tube 20 has substantially the same shape or form as the second flow tube 22. Second flow tube 22 is positioned substantially parallel at all points to first flow tube 20 such that the respective flexures 24, 24' and 28, 28', and the central sections 26, 26' of each tube 20, 22 are positioned adjacent to one another.

An electromagnetic driver system 30 is supported between the central portions 26, 26' of the flow tubes 20, 22. The driver system 30 typically includes a magnet and a coil, each is connected or positioned adjacent one of the flow tubes 20, 22 so that an applied alternating current will cause a, preferably, opposite alternating vibrational motion of the magnet with respect to the coil and a corresponding motion of their tubes 20, 22.

The movement of opposingly positioned flexure portions 24, 24' and 28, 28' on each of the flow tubes 20, 22 is measured with respect to one another by sensors 32 and 34. The sensors 32, 34 may be of any convenient type such as, but not limited to, a magnet and coil type velocity sensor, an optical type switch or as is otherwise generally known in the art. Additional sensing structures are discussed in copending Application No. 926,493, filed Nov. 4, 1986 and titled "Method of Sensing and Structure for Determining Mass Flow", which is herein incorporated by reference. By vibrating adjacent and similarly formed flow tubes 20, 22 in an opposite mode, the flow, which is moving in the same direction through both tubes, reacts against the adjacent flexures in opposite directions. Since the flow in both tubes 20, 22 is substantially equivalent the mass flow rate and the corresponding resultant Coriolis reaction at adjacent positions on the flow tubes 20, 22 is also substantially equal. Thus, the movement measured by the sensors 32, 39 is effectively doubled by this dual tube arrangement. The movement of the adjacent flexures 24, 24' and 28, 28' with respect to one another also eliminates the need for a fixed axis of rotation when making the sensing measurements.

Figure 2:
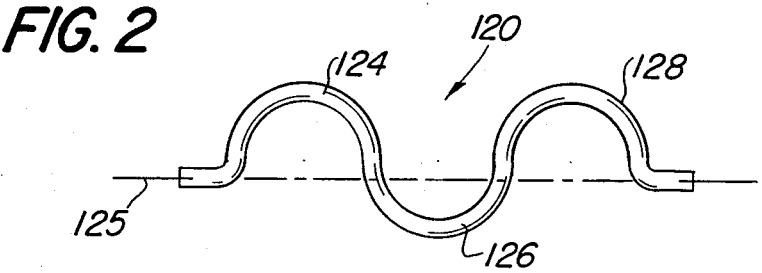
FIG. 2 shows an alternate embodiment of a flow tube contemplated by the present invention.
Figure 3:
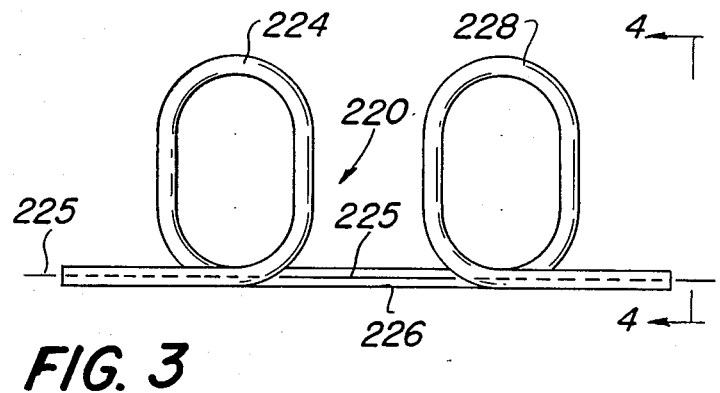
FIG. 3 shows a second alternate embodiment of a flow tube contemplaed by the present invention.
Figure 4:
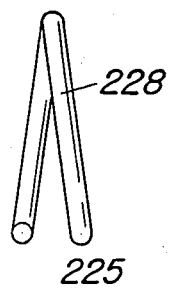
FIG. 4 shows a side view of the embodiment shown in FIG. 3.

The embodiment of the flow tube 120 in FIG. 2 includes a central section 126 which deflects the direction of fluid flow away from the axis center line 125 opposite of the direction of the flexure portions 124 and 128. The conduit 110 is formed in a pattern which resembles 540° of a sine wave. Both flexures 124 and 128 as well as central section 126 are preferably coplanar, as also desired in the conduit 10 of FIG. 1. The flow tube embodiment shown in FIGS. 3 and 4 includes flexures 224, 228 which form loops and, as shown, are substantially oval in shape. The loop type flexure portions 224, 228 preferably limit flow restriction by utilizing gentle curved portions within the 360° turn of the flow. The flexures 224, 228 are preferably formed closely adjacent a single plane which substantially includes the axis line 225 formed by the inlet and outlet of the flow tube 220.

By defining conduit flexures which are separate from the central section or driven portion of the conduit flow rate, the Coriolis reaction force of the fluid produces a more easily measured deflection of the flow tube. The Coriolis reaction force acts on each flexure to create a torsional bending moment or deflection arm relative to the central section. The flexure portions substantially increase the sensitivity of the meter due to the Coriolis reaction and thus the ability of the meter to determine the mass flow rate.

The present invention, because of the contemplated relatively long and flexible conduit or flow tube, is applicable to the teachings of copending application Ser. No. 912,893, filed Sept. 26, 1986 and titled "Mass Flow Measuring Device". This application, which is herein incorporated by reference, relates to the driving of the flow tube at a frequency higher than its fundamental or first resonant vibrational frequency so as to produce nodes or flexure points, within the flow tube length about which the conduit vibrates. The creation of nodes effectively absorbs the effect on the flow tube of unwanted vibrations due to externally positioned machinery and the like and immunizes the sensor signals from contamintaion by this external noise.

The present invention may be embodied in other specific forms without departing from the spirit or essential attributes thereof and, accordingly, reference should be made to the appended claims, rather than to the foregoing specification, as indicating the scope of the invention.

I claim:

1. A continuous conduit within a Coriolis type mass flow meter of the type which is oscillated transverse to the direction of flow and having sensors for measuring motion of the conduit, the sensors generating signals which are processed to determine the mass flow through the meter, the conduit comprising: an inlet and outlet, the inlet and the outlet positioned along a substantially straight line; a first and second flexure portion extending in the same direction away from the substantially straight line, the first flexure in communication with the inlet and the second flexure in communication with the outlet, the first and second flexure portion directing the flow, first, away from the straight line and then returning the flow toward the straight line; and a central section extending between the first and second flexure portion, the flexure portions positioned on opposite sides of the central section in the direction of flow from the inlet to the outlet, and the central section communicating with the first and second flexure portion substantially adjacent the straight line.

2. A continuous conduit as claimed in claim 1 wherein the first and second flexures are each formed in substantially a single plane.

3. A continuous conduit as claimed in claim 1 wherein the first and second flexures are positioned in substantially the same plane which includes the substantially straight line formed by the inlet and outlet.

4. A continuous conduit as claimed in claim 1 wherein the central section directs the flow substantially parallel at all points to the straight line formed by the inlet and outlet.

5. A continuous conduit as claimed in claim 1 wherein the first and second flexures and the central section are formed in a single, substantially horizontal plane.

6. A continuous conduit as claimed in claim 1 wherein the central section is substantially U shaped and the central section and the flexure portions are substantially formed in a single plane.

7. A continuous conduit as claimed in claim 1 wherein the first and second flexures portions and the central section are formed in a substantially sine wave configuration, forming approximately 540° of the wave within substantially a single plane.

8. A continuous conduit as claimed in claim 1 further comprising means to oscillate the conduit at a resonant frequency greater than the fundamental resonance of the conduit so as to produce vibrational nodes within the conduit length.

9. A device for determining the mass of a fluid flowing through a pipeline or defined fluid stream, the device comprising: a continuous conduit having an inlet portion adapted to receive fluid flow from a pipeline, the inlet portion dividing the fluid flow into two substantial equivalent and generally parallel flow paths, an outlet portion adapted to converge the flow within the two flow paths and to exhaust the flow back into the pipeline, each flow path directed through a first flexure portion, a connecting section, and a second flexure portion, the first flexure having an input end in communication with the inlet portion and an output end in communication with the connecting section, the second flexure having an input end in communication with the connecting section and an output end in communication with the outlet portion, each flexure defining a displacement of the direction of flow away from and then returning toward a substantially straight line formed between the inlet portion and the outlet portion, the connecting section positioned substantially parallel to the line formed between the inlet portion and the outlet portion, and the first and second flexure portions communicating with the connecting section substantially adjacent the line; means for vibrating the conduit attached at opposite ends to the connecting section of each flow path, the vibrating means oscillating the flow paths perpendicular to the flow in the connecting sections; means for sensing the Coriolis reaction force of the fluid in response to the oscillation of the vibration means, the sensing means responsive to the movement of the flexure portions and adapted to output a signal proportional to movement of the first flexure portion of each flow path and the second flexure portion of each flow path; and means to determine the mass flow rate of the fluid as a function of the signals produced by the sensing means.

10. A device as claimed in claim 9 wherein the first and second flexure include a continuous loop each formed proximal to a plane including the line between the inlet and outlet.

11. A device as claimed in claim 9 wherein the vibrating means oscillates the conduit at a frequency higher than the fundamental resonant frequency of the conduit so as to produce vibrational nodes within the conduit length.

12. A device for determining the mass of a fluid flowing through a pipeline or defined fluid stream, the device comprising a continuous conduit having an inlet portion adapted to receive flow from a pipeline, the inlet portion dividing the flow into two substantially equivalent and generally parallel flow paths, an outlet portion adapted to converge the flow within the two flow paths and to exhaust the flow back into the pipeline, each flow path directed through a first flexure portion, a connecting section, and a second flexure portion, the first flexure portion having an input end in communication with the inlet portion and an output end in communication with the connecting section, the second flexure portion having an input end in communication with the connection section and an output end in communication with the outlet portion, each flexure portion defining a displacement of the direction of flow away from and then returning toward a substantially straight line formed between the input end of the first flexure portion and the output end of the second flexure portion, the connecting section displacing the flow within the flow path away from the line, and the flexure portions communicating with the connecting section substantially adjacent the line; means for vibrating the conduit attached at opposite ends to the connecting sections of each flow path, the vibrating means oscillating the flow paths perpendicular to the flow therein; means for sensing the Coriolis reaction of the fluid on the first and second flexure portions in response to the oscillation of the vibrating means; and means to determine the mass flow rate of the fluid as a function of the signals produced by the sensing means.

13. A device as claimed in claim 12 wherein the connecting section of each flow stream generally defines a U-shape.

14. A device as claimed in claim 12 wherein the connecting section of the flow streams generally displaces the direction of flow in an opposite direction with respect to the straight line from the flow displacement of the flexure portions.

15. In a Coriolis mass flow meter conduit of the type oscillated transverse to the direction of flow therein ad having sensors mounted on or adjacent the flow tube located symmetrically with respect to and on opposite sides of the oscillation point, the sensors generating signals representative of the motion of the flow tube and means for determining the mass flow through the flow tube from said signals, comprising: a continuous flow tube having an inlet and an outlet, the inlet and the outlet positioned along a substantially straight line; a first flexure portion, a second flexure portion, the first flexure portion communicating with the inlet, the second flexure portion communicating with the outlet, and a central section communicating at opposite ends with the first and second flexure portion, the flexure portions positioned on opposite sides of the central section in the direction of flow from the inlet to the outlet, and the first and second flexure portions respectively communicating with the central section at separate locations along and substantially along the straight line, each of the flexure positions directing the flow, first, away from the straight line and then returning the flow towards the straight line; and the oscillating means vibrating the conduit at a resonant frequency higher than the fundamental resonance of the flow tube so as to create nodes within the flow tube length with the sensors generating signals to determine the Coriolis reaction of the flow through the flow tubes, the sensors positioned on each flexure portion.

* * * * *